June 18, 1968 E. FRISCH 3,389,056
FUEL ASSEMBLIES
Filed July 9, 1964 7 Sheets-Sheet 3

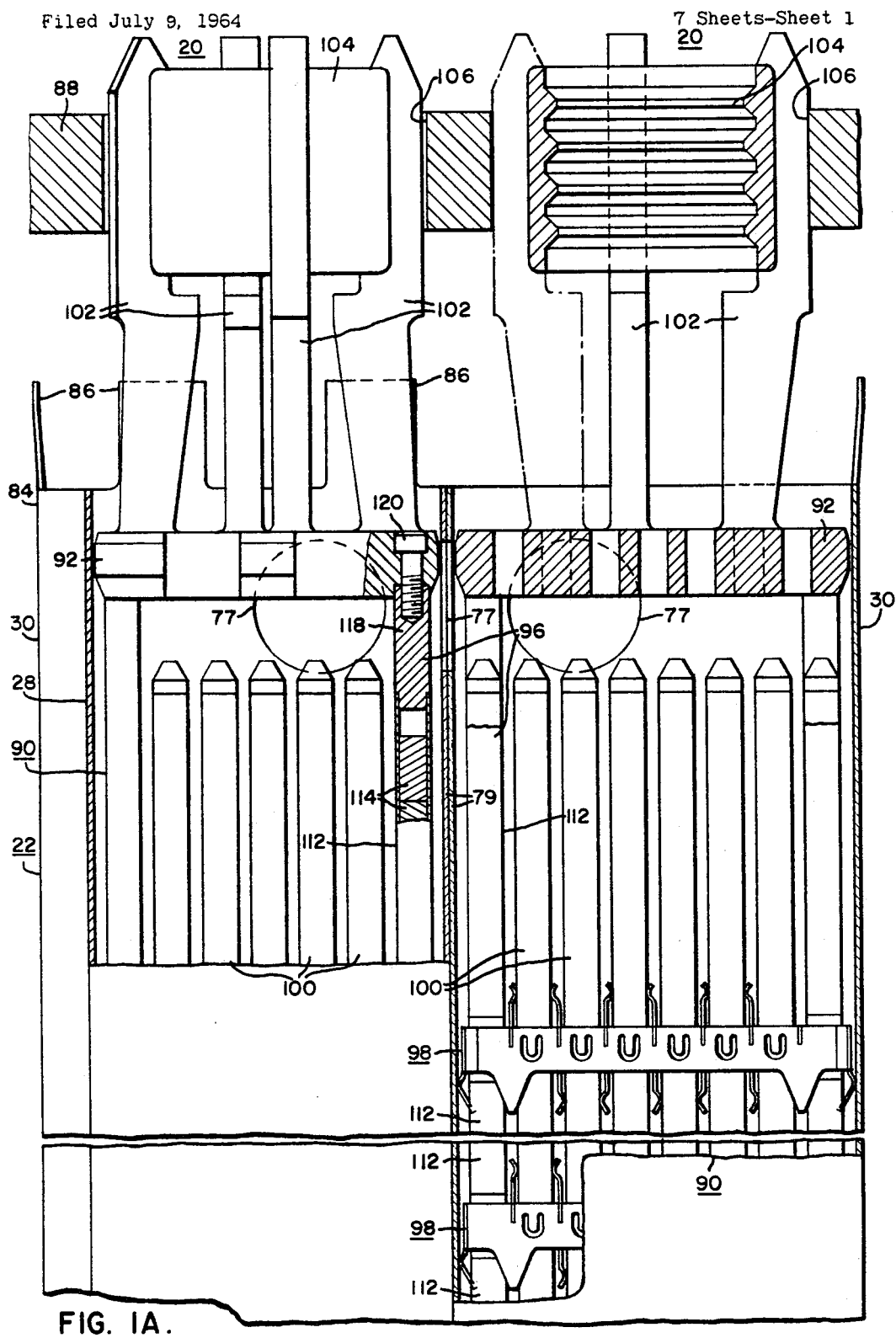
FIG. IA.

WITNESSES:
John L. Chopp
James F. Young

INVENTOR
Erling Frisch
BY A. J. Santantonio

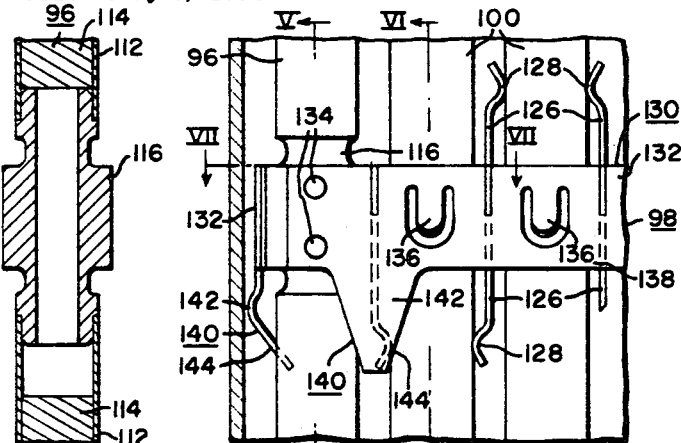
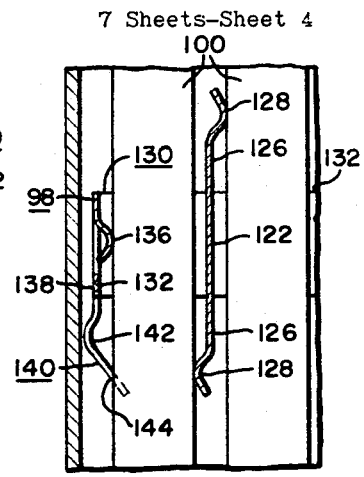
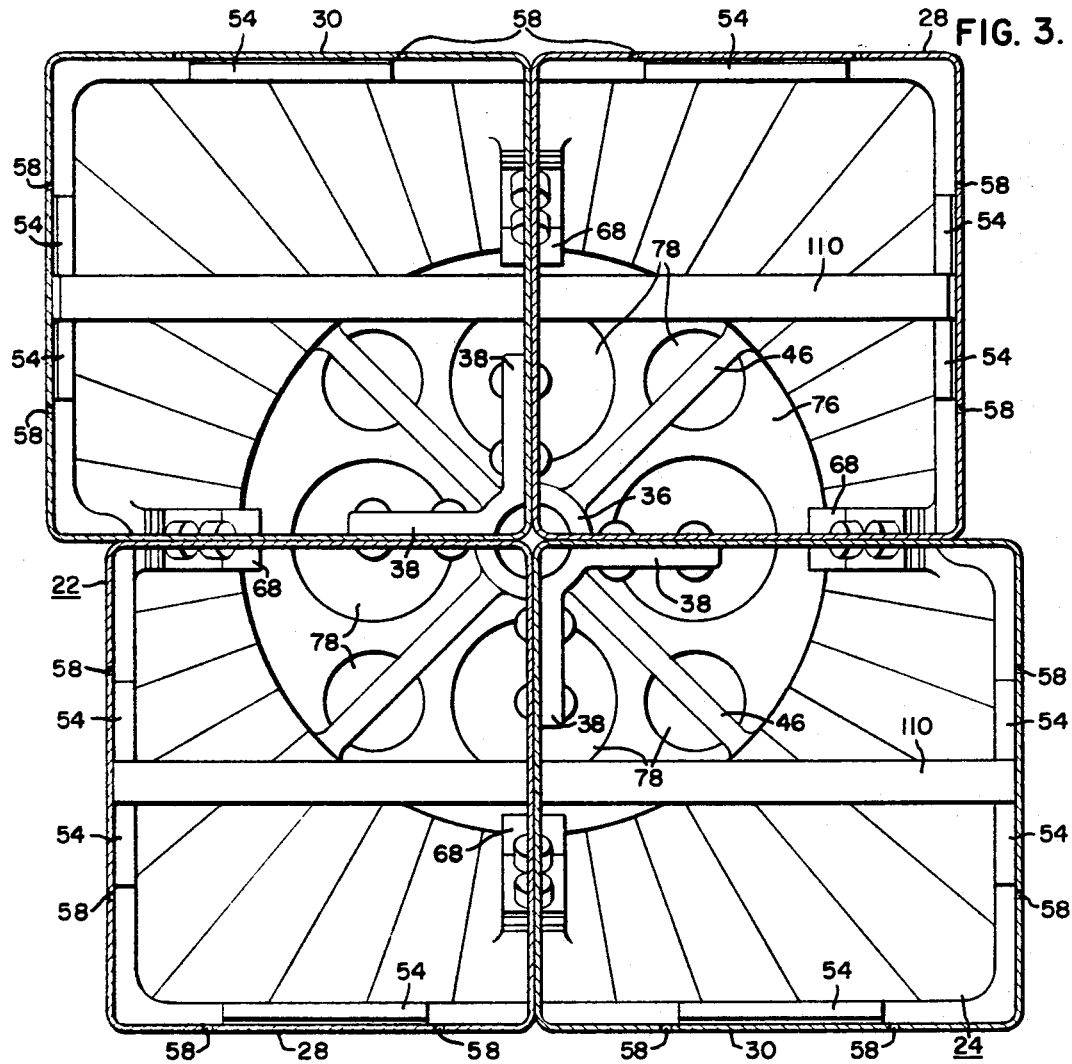

June 18, 1968
E. FRISCH
3,389,056
FUEL ASSEMBLIES
Filed July 9, 1964
7 Sheets-Sheet 5
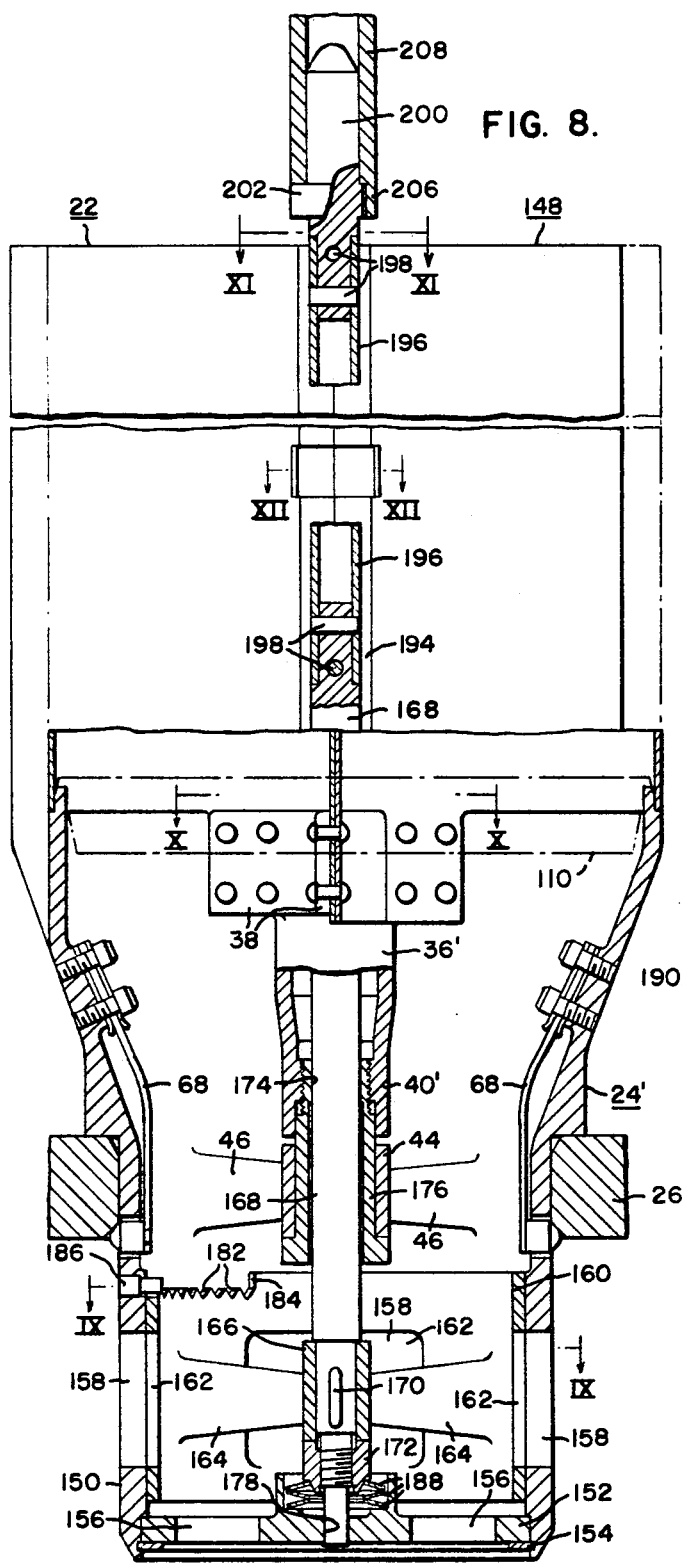
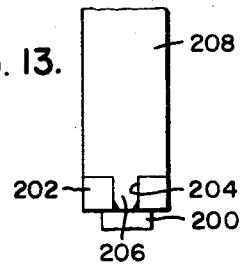
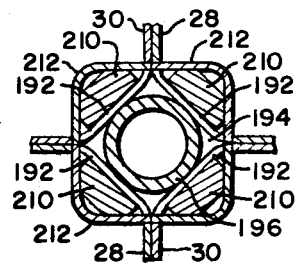
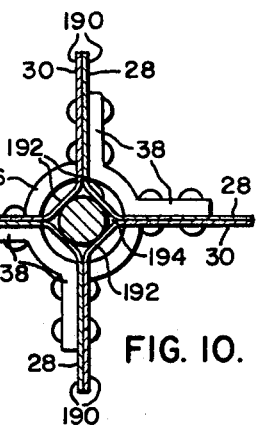
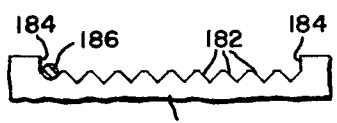

United States Patent Office 3,389,056
Patented June 18, 1968

3,389,056
FUEL ASSEMBLIES
Erling Frisch, Pittsburgh, Pa., assignor to Westinghouse Electric Corporation, Pittsburgh, Pa., a corporation of Pennsylvania
Filed July 9, 1964, Ser. No. 381,502
20 Claims. (Cl. 176—78)

This invention relates to fuel assemblies adapted for use in a nuclear power reactor, and more particularly to improvements in the construction of fuel assemblies by compartmentation and/or wherein orifice means are employed in metering a coolant fluid.

With the increase in size of reactors, it has become difficult to produce a large, relatively thin tubing of irregular cross-section from a material with low absorption cross-section, such as Zircaloy, to the necessary dimensional tolerances. On the other hand, the smaller, square or rectangular, thinner-walled tubes can be produced relatively easily from round seam welded tubing by die drawing. In addition, the fuel element bundles, which are inserted into the aforementioned tubing, have comparatively little stiffness and strength because of the absence of the integrated enclosure and must be limited in size for safety reasons and for ease of handling.

It is also desirable to provide means for adjusting the amount of coolant flow through individual fuel element bundles or individual fuel assemblies in order to improve the hot channel factor of reactors.

It is an overall object of the invention to provide a fuel assembly of improved construction.

Another object of the invention is to provide a fuel assembly in which the can assembly is compartmented thereby permitting the use of a plurality of fuel element bundles.

Still another object of the invention is to provide a fuel assembly wherein means are provided for compensating for the difference in the thermal expansion between the can assembly and a nozzle secured thereto.

Yet another object of the invention is to provide an orificed fuel assembly having means permitting adjustment of a coolant fluid flow control device from a point disposed externally of the fuel assembly.

A still further object of the invention is to facilitate the insertion of fuel element bundles into each compartment of the can assembly.

Still another object of the invention is to provide a fuel assembly having a compartmented can assembly of improved construction which is capable of receiving a plurality of fuel element bundles having different enrichments.

A further object of the invention is to provide an orificed fuel assembly having a compartmented can assembly wherein a coolant fluid may be introduced into each compartment at a different rate of flow.

The above objects, features and advantages of the invention will be made apparent during the ensuing description of illustrative forms thereof, said description being taken in conjunction with the accompanying drawings wherein:

FIGURES 1A and 1B are views which when placed end-to-end comprise a side view, partly in cross section, of an orificed fuel assembly constructed in accordance with the principles of the invention;

FIG. 3 is a sectional view of FIG. 1 taken along reference line III—III thereof;

FIG. 4 is an enlarged fragmentary sectional view of a spring clip grid assembly constructed in accordance with the prinicples of the invention;

FIG. 5 is a sectional view of FIG. 4 taken along the reference line V—V thereof;

FIG. 6 is a sectional view of FIG. 4 taken along the reference line VI—VI thereof;

FIG. 8 is a sectional view illustrating a variable orifice means constructed in accordance with the principles of the invention;

FIG. 10 is a sectional view of FIG. 8 taken along the reference line X—X thereof;

FIG. 12 is a fragmentary sectional view of FIG. 8, on an enlarged scale, taken along the reference line XII—XII thereof;

FIG. 13 is a fragmentary view of a shaft rotating member employed in the embodiment of FIG. 8;

FIG. 14 is a fragmentary sectional view of FIG. 9 taken along the reference line XIV—XIV thereof;

Figure 1B:
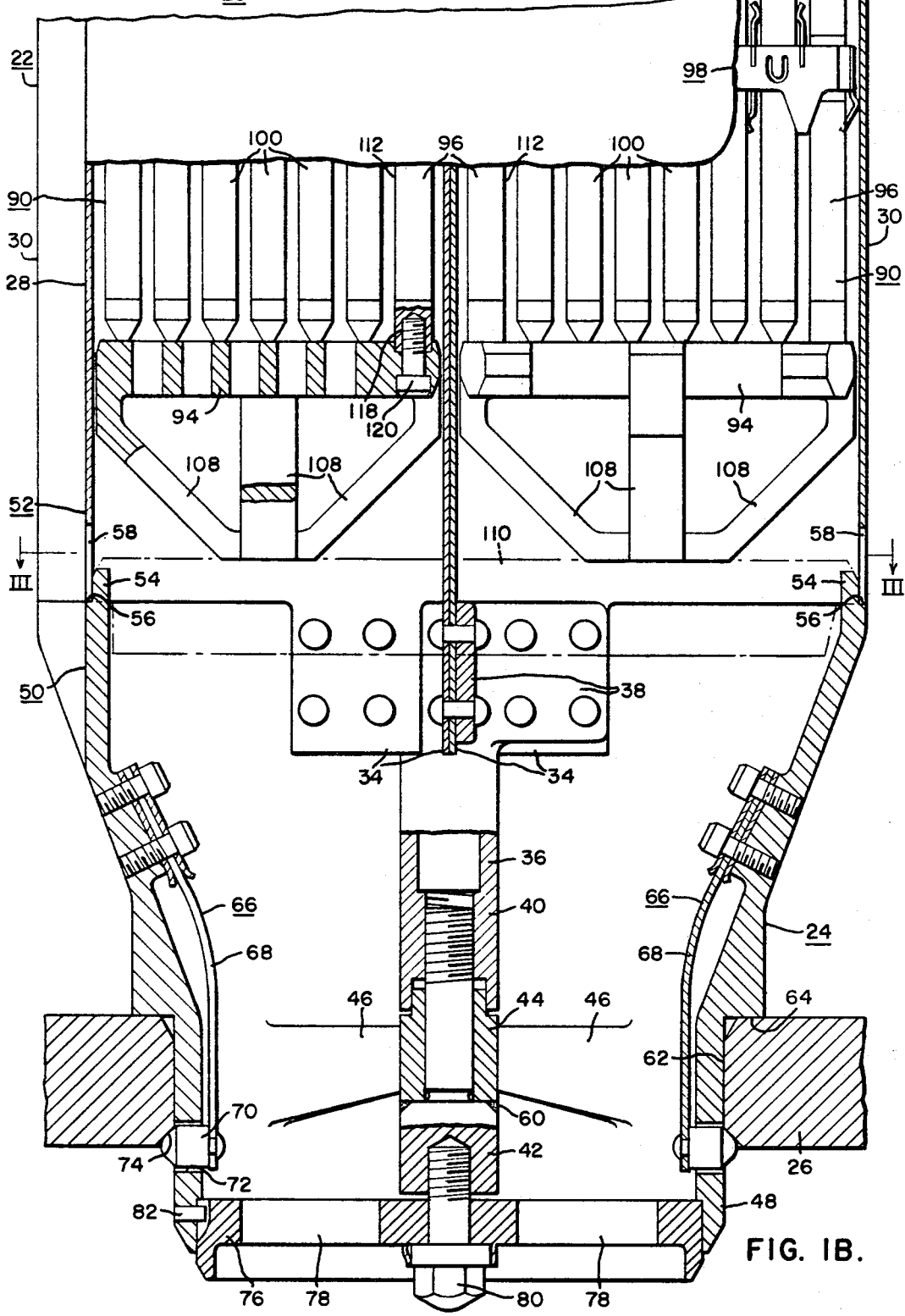

According to the invention, there is provided a fuel assembly comprising a can assembly and an end portion, such as a nozzle, detachably secured to the lower end thereof. In addition, the lower end portion is detachably secured to and supported by the lower core supporting plate. Turning now to the production of a large can assembly with considerably less difficulty, each can assembly is formed from a plurality of elongated tubular members which are secured together and each of which is capable of receiving a fuel element bundle. Such compartmentation of the individual can assembly makes possible the use of smaller fuel element bundles which, in turn, results in the added advantage of providing more latitude in the selection of the geometry for the inner core regions so as to approach more nearly cylindrical boundaries. Since this method of compartmentation makes it possible to increase the overall dimensions of a fuel assembly, compartmentation also makes possible a reduction in the number of control rods required for a core. Means also is provided in the construction of the fuel element bundles which facilities their insertion into the can assembly and wherein the probability of their damage during handling is minimized.

Another feature of this invention is the use of flexure tabs, which project above the upper outer edges of the tubular members. The tabs are outwardly inclined and are formed with a slight curvature. Thus the tabs of adjacent fuel assemblies will be engaged and provide resilient connection therebetween so as to permit thermal expansion among the fuel assemblies or to eliminate or substantially reduce fretting to the fuel assemblies.

According to a further embodiment of the invention there is provided a fuel assembly wherein a nozzle, containing an orifice plate, directs a coolant fluid through a can assembly which is secured to the nozzle. To take full advantage of the orificing, a can assembly is provided from a plurality of solid-wall elongated tubular members which are secured together and each of which is capable of receiving a fuel element bundle. Each tubular member preferably is formed from a material having a low absorption cross section such as zirconium base alloy. The can assembly is secured to the nozzle in a manner which compensates for the difference in thermal expansion between the can assembly and the nozzle when different materials are used therein.

According to a further embodiment of the invention, a variable orifice means is provided for metering the coolant fluid flow through the can assembly. Accompanying the variable orifice means is an adjustment means which permits adjustments to be made to the orifice means from a point disposed externally of the reactor core.

According to a further embodiment of the invention, an individual orifice is provided for metering the coolant flow through each compartment of the can assembly. Thus, the present orificed fuel assembly has a compartmented can assembly which is capable of receiving a plurality of fuel element bundles having different enrichments and wherein the required coolant flow is adjusted in accordance with the enrichment of the fuel element bundles. Furthermore, each orifice means is detachably secured in the fuel assembly whereby its replacement, when required, may be accomplished with a minimum of effort.

Referring now in particular to FIGS. 1A to 3, there is shown a fuel assembly 20 comprising a compartmented can assembly 22 and a nozzle 24 secured to the lower end thereof which is detachably secured to and supported by a lower core support plate 26.

Figure 2:
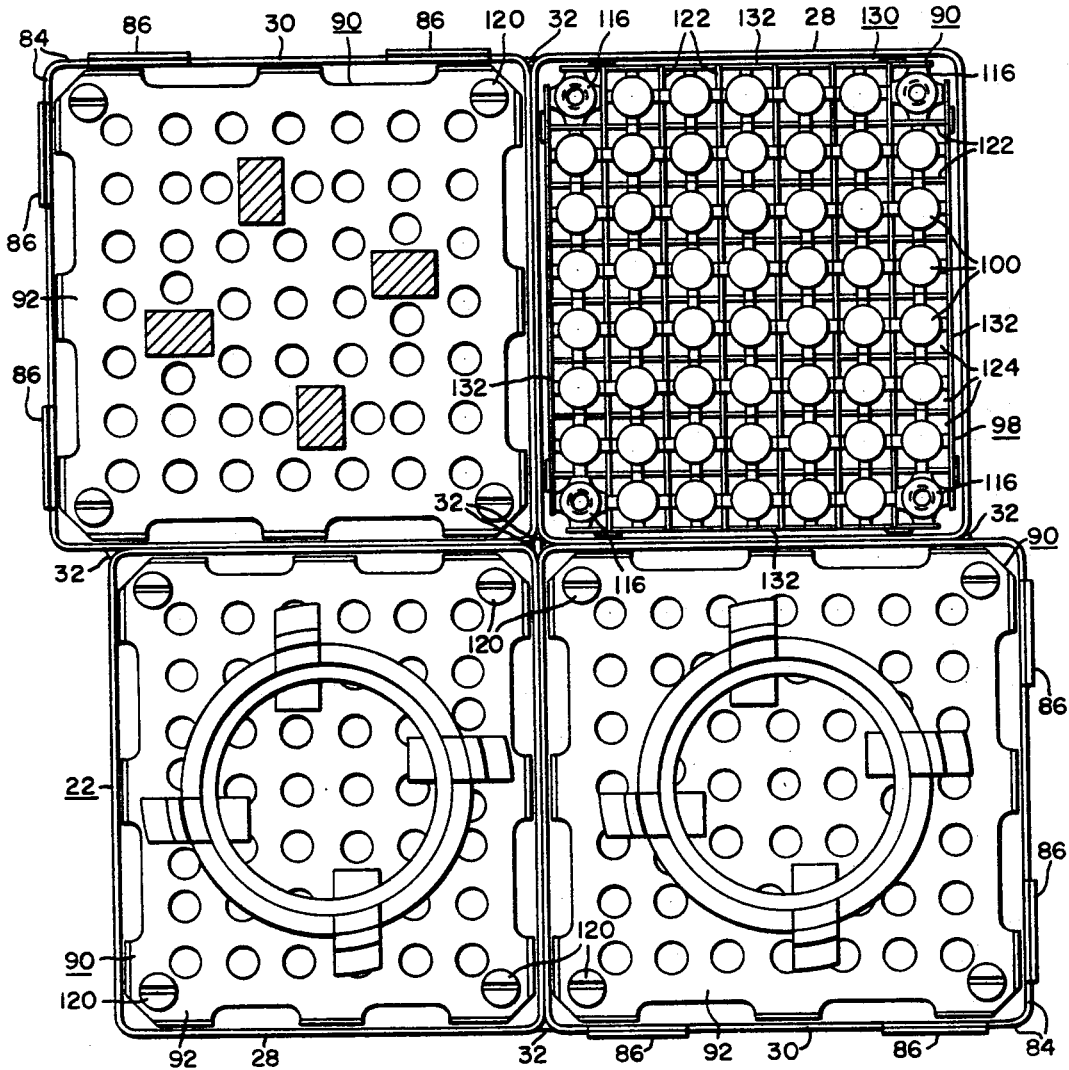
FIG. 2 is a plan view of the orificed fuel assembly of FIG. 1 with parts broken away to show details.
Figure 7:
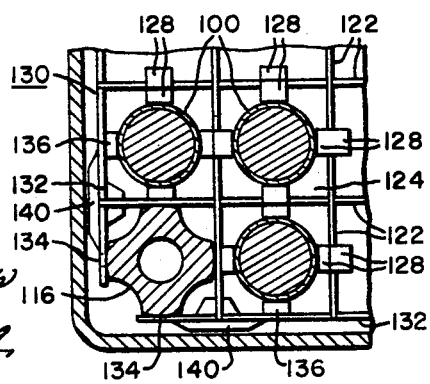
FIG. 7 is a sectional view of FIG. 4 taken generally along the reference line VII—VII thereof.

The can assembly 22 comprises a plurality of elongated tubular members, two of which have a square cross section and are identified by the numeral 30 and the other two of which have a generally rectangular cross section and are identified by the numeral 28. As best seen in FIG. 2, the tubular members 28, 30 are secured together by means of a plurality of widely spaced, seam welds 32. Each tubular member 28, 30 has two adjacent inner side walls each of which is engaged with an inner side wall of an adjacent tubular member. Thus, the resulting can assembly has a generally rectangular cross section. The tubular members 28, 30 preferably are fabricated from a material which has a low neutron absorption cross section, such as a zirconium base alloy, and are of a solid-wall construction. It is relatively easy to form the tubular members 28, 30 from round seam welded tubing by a die drawing operation.

As best seen in FIGS. 1B and 3, tabs 34 are provided, one depending from the lower edge of the inner side walls of each tubular member 28, 30. A central stud 36 includes arms 38 each of which is secured to an overlapped pair of the tabs 34 of adjacent tubular members 28, 30 by any suitable means, such as riveting. The central stud 36 includes an internally threaded lower end portion 40 into which is threaded a bolt 42. Received on the shank of the bolt 42, is a boss 44 having arms 46 extending radially therefrom and which are contiguous with a cylindrical lower end 48 of the nozzle 24.

The nozzle 24 has an upper end 50 whose circumferential profile matches that of a lower peripheral wall 52 of the can assembly 22. Thus, the nozzle 24 encloses the lower end of the can assembly 22 and serves to direct a coolant fluid simultaneously to all of the tubular members 28, 30. The upper end 50 of the nozzle 24 includes a plurality of spaced-apart lips 54 projecting upwardly from a shoulder 56 formed therein. The lips 54 preferably are disposed internally of the peripheral wall 52 and engaged with the inner surface thereof.

The nozzle 24 preferably is fabricated from a non-corrosive material, such as an iron base alloy, and is cast into the desired shape. Because of the different materials used in fabricating the can assembly 22 and the nozzle 24, means preferably is provided to compensate for the difference in their thermal expansions. As shown in FIGS. 1B and 3, a plurality of laterally spaced slits 58 are cut in the lower peripheral wall 52 and extend from the lower edge thereof vertically beyond the region of engagement between the lips 54 and the peripheral wall 52. Therefore, the lower peripheral wall 52 is radially expansible, i.e., capable of expansion and contraction, whereby it may compensate for the difference in thermal expansion between the can assembly 22 and the nozzle 24.

In securing the nozzle 24 to the can assembly 22, the bolt 42 is tightened down so as to force the lower edge of the peripheral wall 52 tightly against the shoulder 56. Thereafter, it is preferred that the bolt 42 be secured to the boss 44 by means of spot weld 60 (FIG. 1B) to insure against loosening of the bolt 42 and yet permit easy removal thereof when desired.

As stated above, the nozzle 24 is detachably secured to and supported by the lower core support plate 26. The cylindrical lower end 48 projects through an opening 62 formed in the lower core support plate 26 and includes a shoulder 64 which is engaged with the support plate 26. Latching means 66 is provided for detachably securing the nozzle to the plate 26. The latching means 66 comprises a plurality of leaf springs 68 having their upper ends secured to the nozzle 24. The lower end of each leaf spring 68 is provided with a lug 70 which projects through an aperture 72 in the lower wall 48 of the nozzle 24 and into engagement with a chamfered edge 74 of the opening 62. The leaf springs 68 are designed so that an appreciable force is required to remove the nozzle 24 from the lower core support plate 26. Therefore, the fuel assembly 20 will remain in place in the reactor core (not shown) during normal fuel transfer and is removed only for inspection or to change an orifice plate 76 described hereinafter. Holes 77 near the upper end of the central walls 79 of the tubular members 28 and 30 serve as locations for the attachment of a special removal tool (not shown).

To meter the flow of coolant fluid through the can assembly 22, the orifice plate 76 having a plurality of orifice openings 78 of predetermined diameter formed therein, is secured to the lower end 48 of the nozzle 24 by means of a second bolt 80 threaded into the head of the bolt 42. A pin 82 projecting inwardly from the lower end 48 serves to orient the orifice openings 78 relative to the tubular members 28, 30 in the position shown in FIG. 3.

Referring to FIGS. 1A and 2, the adjacent outer side walls 84 of the tubular members 30 are provided with flexure tabs 86 which project above the upper edge of the tubular members 30. The flexure tabs 86 are outwardly inclined and are formed with a slight vertical curvature. The flexure tabs 86 are capable of maintaining a close fit between adjacent orificed fuel assemblies under varying temperature conditions. That is to say, the flexure tabs 86 of adjacent orificed fuel assemblies will be engaged and provide a resilient connection therebetween which will yield to permit thermal expansion to take place and yet retain the positions of the adjacent orificed fuel assemblies relative to one another. In addition, the resilient connection among the tabs will eliminate or substantially reduce fretting to the fuel assemblies. If desired, an upper core support plate 88 may be provided to insure accurate locationing of the orificed fuel assemblies.

Since the can assembly 22 is compartmented—each of the tubular members 28, 30 defining one compartment—it is capable of receiving a plurality of the fuel element bundles 90, as shown in FIGS. 1A, 1B and 2. Each of the fuel element bundles 90 comprises upper and lower end plates 92, 94 connected together by means of tie rods 96 each extending between corresponding corners of the end plates 92, 94. At spaced points along the lengths of the tie rods 96, there are provided horizontal spring clip grid assemblies 98 which serve to support and maintain a plurality of rod-type fuel elements 100 in a spaced array within the associated tubular members 28, 30.

The upper end plates 92 each include a plurality of vertically extending connecting arms 102. An internally threaded socket 104 (FIG. 1A) is secured to the arms 102 and serves in handling the fuel element bundle 90 during its insertion and withdrawal from the tubular members 28, 30. The connecting arms 102 project through openings 106 formed in the upper core support plate 88 thereby maintaining the fuel element bundles 90 properly positioned with respect to the tubular members 28, 30.

Each of the lower end plates 94 is provided with a plurality of inwardly inclined arms 108 which are joined at their lower ends and rest on crossbars 110 extending across the top of the nozzle 24. As can be seen in FIGS. 1B and 3, the crossbars 110 are locked in place when the can assembly 22 is secured to the nozzle 24.

The construction of the fuel element bundles 90 of the present invention provides several distinct features which have heretofore been unavailable. For example, in the present invention, the tie rods 96 perform the conventional function of connecting the end plates 92, 94. However, in addition they serve to encase additional fissile fuel material whereby each of the fuel element bundles 90 contains a significantly greater amount of fissile fuel material than those fuel element bundles of similar size and of conventional design.

Referring to FIGS. 1A, 1B and 5, each of the tie rods 96 comprises at least one and preferably a plurality of tubular segments 112 into which are placed uranium oxide pellets 114. Intermediate plug members 116 (FIG. 5) are seal-welded to the tubular segments 112 thereby connecting and maintaining them axially aligned. The spring clip grid assemblies 98 are disposed at the same level as the intermediate plug members 116 as will be described. Into the ends of the uppermost and lowermost tubular segments 112 there are inserted end plugs 118 which project therefrom and abut the end plates 92, 94. The end plugs 118 are seal-welded to the tubular segments 112 and are secured to the end plates 92, 94 by means of fasteners 120.

Other features of the fuel element bundles 90 of the present invention concern the ease with which they are inserted into and withdrawn from the tubular members 28, 30 and the means by which they are spaced from the walls of the tubular members 28, 30. Referring to FIGS. 2, 4, 6 and 7, the spring clip grid assemblies 98 are for the most part of conventional design comprising a plurality of horizontally extending vertical plate members 122 which are secured together in a criss-crossing pattern so as to define a plurality of openings 124 through which the rod-type fuel elements 100 extend. In order to maintain the rod-type fuel elements 100 centered within the openings 124 and equally spaced from one another, a plurality of spring tabs 126 are provided, some of which depend from the lower edge and some of which project upwardly from the upper edge of the vertical plate members 122. Each of the spring tabs 126 includes an arcuate end portion 128 which is frictionally engaged with a rod-type fuel element 100. Thus, at the level of the spring clip grid assembly 98, each of the rod-type fuel elements 100 is frictionally engaged and retained by a plurality of the spring tabs 126.

In accordance with the principles of the present invention, however, the spring clip grid assemblies 98 differ from conventional designs as follows. Each spring clip grid assembly 98 has a peripheral metal band 130 which surrounds the fuel elements 100 and to which the ends of the vertical plate members 122 are secured. The peripheral metal band 130 comprises a plurality of flat metal segments 132 each extending between a pair of the tie rods 96 and having their ends secured to the intermediate plug members 116 preferably by means of welds 134 (FIG. 4).

In each of the regions of the openings 124 of the grid assembly 98, an arcuate spring tab or clip member 136 is formed in the metal segments 132 by any suitable means such as a punching operation. The arcuate spring tabs 136 thus comprise punched-out portions which project inwardly into frictional engagement with those fuel elements 100 residing in the periphery of the grid assembly 98. In this manner, the outer surfaces 138 of the flat metal segments 132 are free of projecting elements which would interfere during the insertion and withdrawal of the fuel element bundles 90 from the can assembly 22.

As further aid to the insertion and withdrawal of the fuel element bundles 90, the flat metal segments 132 are provided with depending tongues 140, one each preferably positioned at each end thereof. Each tongue 140 comprises a central arcuate portion 142 which projects outwardly of the outer surface 138 and terminates in an inwardly inclined lower end portion 144 extending between a tie rod 96 and a fuel element 100. The arcuate central portions 142 and the inclined lower end portions 144 provide smooth surfaces which are slidable over wall portions of the tubular members 28, 30 without hindering the movement of the fuel element bundles 90 through the tubular members 28, 30. Furthermore, the arcuate central portions 142 are capable of maintaining the bundles 90 spaced-apart from the walls of the tubular members 28, 30 by a predetermined distance.

Because of their construction, the fuel element bundles 90 are somewhat flexible. However, they still may be handled and inserted into the tubular members 28, 30 with very little danger of damage. The flexibility in itself actually is of some advantage since it permits the fuel element bundle 90 to slide into the tubular members 28, 30 even though considerable discrepancies in twist and bowing may exist in the can assembly 22.

An alternative embodiment of the present orificed fuel assembly, generally designated by the numeral 148, is illustrated in FIGS. 8 to 14 inclusive. Corresponding numerals will be employed to identify corresponding parts already described.

In this embodiment, means is provided for adjusting the flow of coolant fluid through each individual can assembly of an entire nuclear reactor core. Furthermore, the flow of coolant may be adjusted from a point external to the nuclear reactor core. This is a particularly desirable feature in that it now is not necessary, as in the past, to withdraw the fuel element bundles and then remove the can assembly and nozzle to a handling area where the orifice plate is remotely replaced.

Figure 9:
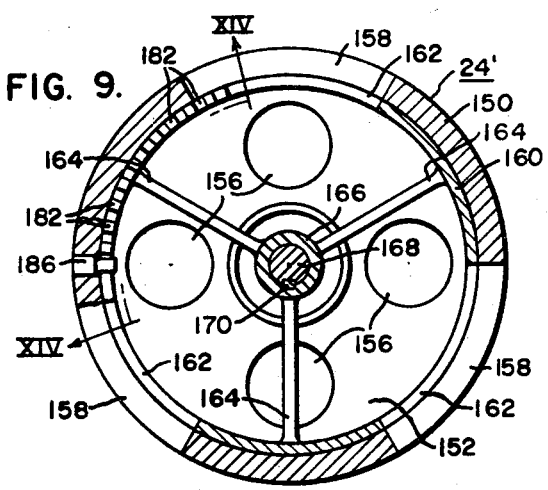
FIG. 9 is a sectional view of FIG. 8 taken along the reference line IX—IX thereof.

As can be seen in FIGS. 8 and 9, a nozzle 24' is provided which is similar to the nozzle 24 of FIG. 1B. The nozzle 24', however, has a lower cylindrical extension 150 provided with an orifice plate 152 which is secured to the lower end thereof by means of a snap ring 154. The orifice plate 152 is provided with orifice openings 156 which are small and which admit less than the minimum coolant flow required in any core location. Additional coolant is admitted through a plurality of preferably square nozzle orifice openings 158 formed in the cylindrical extension 150. A cylindrical sleeve 160 is positioned within the cylindrical extension 150 and includes sleeve orifice openings 162 corresponding to the nozzle orifice openings 158. Close tolerances are maintained between the sleeve 160 and the cylindrical extension 150 in order to minimize leakage flow of the coolant fluid. By rotating the sleeve 160 clockwise from the position shown in FIG. 9, the nozzle orifice openings 158 will be closed gradually. The sleeve 160 includes a plurality of support arms 164 to the ends of which is secured a second boss 166. The sleeve 160 is supported on a central shaft 168 which is secured to the second boss 166 by means of a key 170 and a nut 172.

The central shaft 168 is guided at its upper end on a bearing 174 formed in a hollow bolt 176 and at its lower end by a bearing comprising an opening 178 in the orifice plate 152. The hollow bolt 176 serves to connect the nozzle 24' to the compartmented can assembly 22 in the same manner as the bolt 42 of the embodiment of FIG. 1B. That is to say, the hollow bolt 176 extends through the boss 44 and is threaded into a lower portion 40' of a central stud 36'. The central stud 36' is hollow so as to accommodate the central shaft 168.

The nozzle 24' is provided with a detent means for maintaining the sleeve orifice openings 162 in a predetermined orientation with respect to the nozzle orifice openings 158. Referring to FIGS. 8, 9 and 14, a plurality of serrations 182 are formed in the upper edge of the sleeve 160. The serrations 182 extend for a predetermined distance around the circumference of the sleeve 160 and terminate at each end in a vertical wall 184 (FIG. 14). Each of the serrations 182 is engageable by a pin 186 projecting from the lower cylindrical extension 150 of the nozzle 24'. The cooperative action of the pin 186 and the serrations 182 is such that the sleeve 160 is positionable in one extreme position wherein maximum flow of coolant fluid is permitted through the nozzle orifice openings 158 to another extreme position wherein said sleeve 160 substantially entirely blocks the flow of coolant fluid through said nozzle orifice openings 158.

In order to release the sleeve 160 for rotation, the central shaft 168 and the sleeve 160 are yieldably supported for reciprocal vertical movement. Belleville springs 188 interposed between the nut 172 and the orifice plate 152 serve to resiliently urge the sleeve 160 into engagement with the pin 186. Thus, downward movement of the central shaft 168 will release the engagement between the pin 186 with one of the serrations 182 whereupon the sleeve 160 may be rotated to a new position with respect to the nozzle 24' and locked therein by release of the central shaft 168.

Referring now to FIGS. 8, 10–13, it will be seen that at the juncture of the adjacent inner side walls 190 of the tubular members 28, 30, there are provided beveled wall portions 192 which define a central passageway 194 extending throughout the length of the can assembly 22. The central shaft 168 extends for a short distance through the central passageway 194. A tubing 196, secured to the end of the shaft 168 by means of pins 198, extends through the central passageway 194 and serves as an extension of the central shaft 168. A fixture 200 is secured to the tubular member 196 by means of additional ones of the pins 198. The fixture 200 has a central collar 202 provided with a slot 204 into which is inserted a tooth 206 projecting from the end of a positioning tool 208. The positioning tool 208 is used to depress and rotate the diaphragm 160 during adjustments in the coolant flow. Furthermore, the positioning tool 208 is as long as required so that adjustments in the coolant flow may be accomplished from a point external to the nuclear reactor core.

Figure 11:
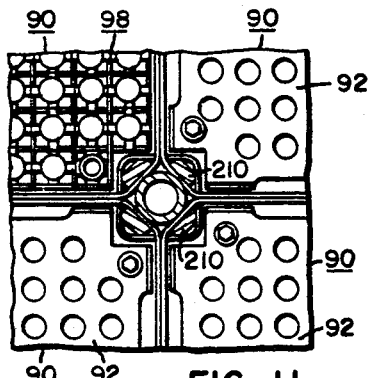
FIG. 11 is a sectional view of FIG. 8 taken along the reference line XI—XI thereof.

As can be seen in FIG. 11, one corner fuel element 100 of each fuel element bundle 90 must be eliminated to make room for the central passageway 194. To prevent flux peaking, the space vacated by the removed fuel elements 100 may be partly filled by spacer bars 210 (FIG. 12) which are supported at intervals by means of narrow V-straps 212 welded to the edges of rectangular openings cut in the beveled wall portions 192. The spacer bars 210 also may be formed from a zirconium base alloy if desired.

Figure 16:
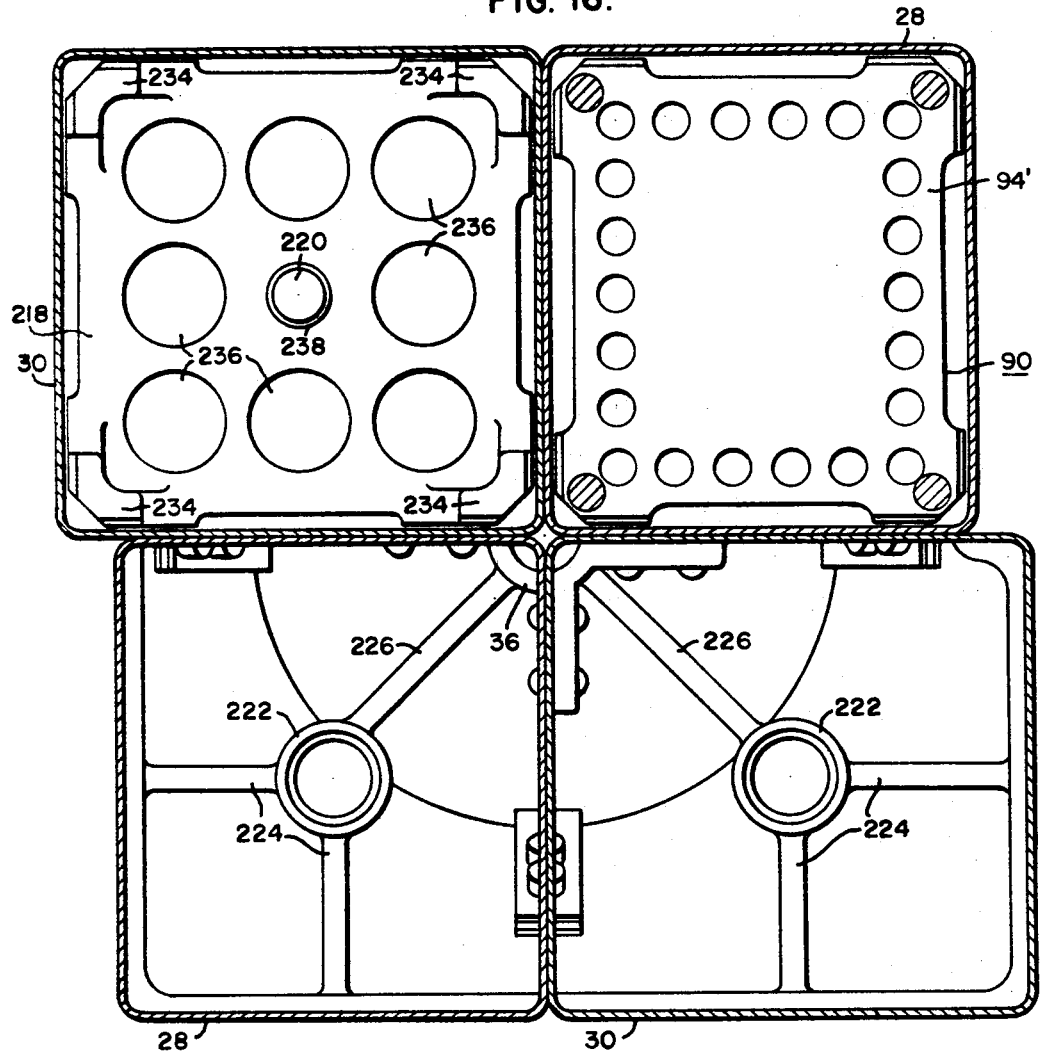
FIG. 16 is a sectional view of FIG. 15 taken along the reference line XVI—XVI thereof with parts removed to show details.
Figure 15:
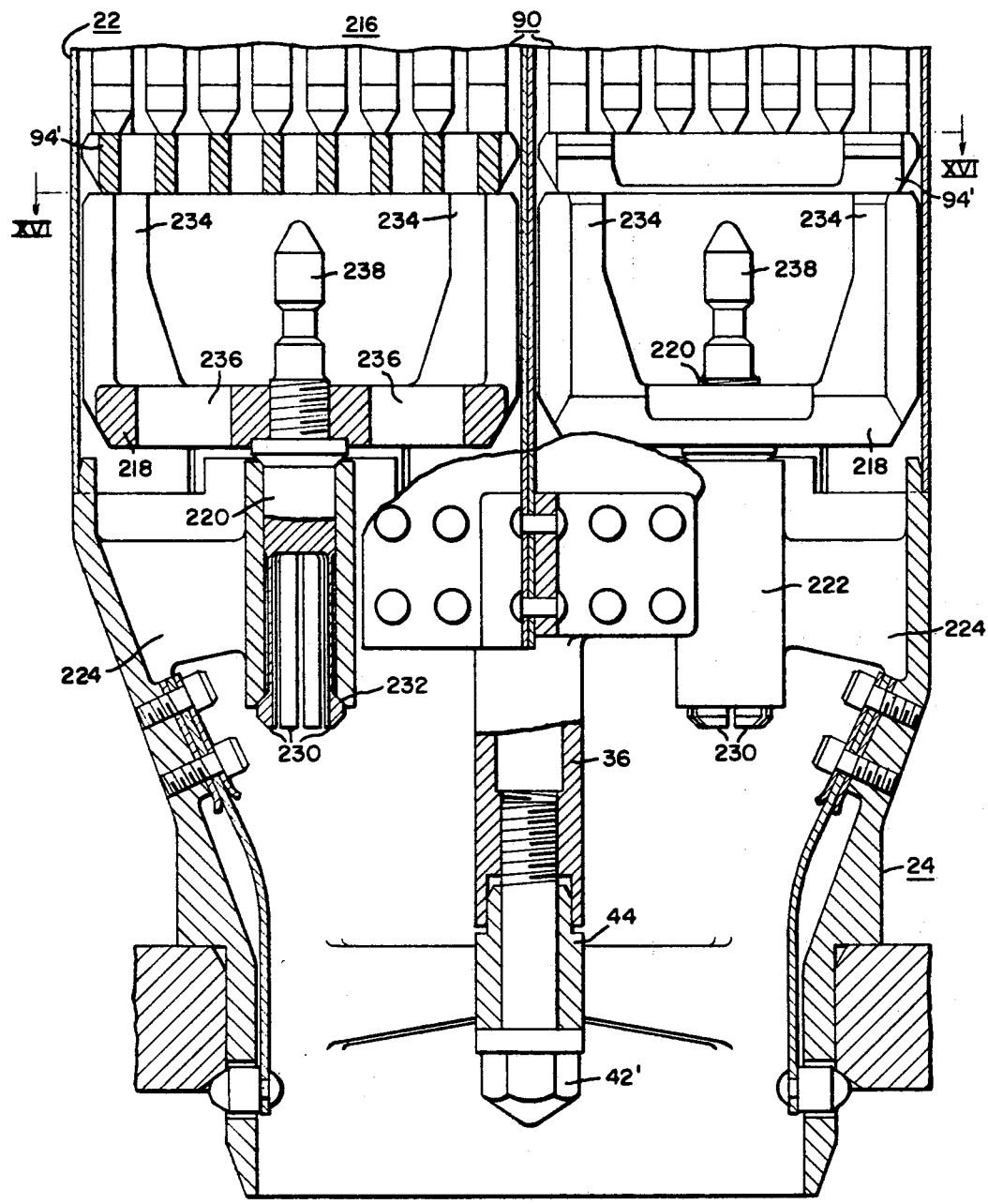
FIG. 15 is a fragmentary sectional view illustrating an alternative configuration of the orificed fuel assembly of FIGS. 1A and 1B.

A further alternative embodiment of the present orificed fuel assembly is generally designated by the numeral 216 and is illustrated in FIGS. 15 and 16. Corresponding numerals will be employed to identify corresponding parts already described.

In this embodiment, the can assembly 22 again is formed from the tubular members 28, 30. The nozzle 24 is connected to the can assembly 22 in the same manner as in the embodiment illustrated in FIGS. 1A and 1B, i.e., by means of the central stud 36, the boss 44 and the bolt 42'.

This embodiment differs from that of FIGS. 1A and 1B, in that an orifice plate 218 is provided for each of the tubular members 28, 30. Central studs 220, one each secured to each of the orifice plates 218, depend downwardly therefrom through bosses 222 each supported in part on arms 224 extending from the nozzle 24 and by arms 226 extending from the stud 36. Each central stud 220 has spring fingers 230 formed in the lower end thereof each of which includes a shoulder 232 engaged over the lower end of the associated boss 22. In this manner, each orifice plate 218 is individually detachably secured to its nozzle 24.

Each of the orifice plates 218 includes a plurality of arms 234 extending vertically from the upper face thereof. A lower end plate 94' of each fuel element bundle 90 rests on the support arms 234. Thus, each fuel element bundle 90 is supported directly by the nozzle 24.

In certain locations of the nuclear reactor core, it becomes necessary to insert fuel element bundles with different enrichments into the same can assembly. This requires different coolant flow rates through each individual tubular member. The orificed fuel assembly 216, being provided with a separate orifice plate 218 for each of the tubular members 28, 30, is capable of producing the required results. Thus, the orifice plates 218 are provided with orifice openings 236 whose diameter depends on the coolant flow requirement of the fuel element bundle 90 to which it is metering coolant fluid. In any one orificed fuel assembly 216, it is possible to have four fuel element bundles 90 each of different enrichment and four orifice plates 218 each with different sized orifice openings 236, each plate metering coolant fluid at a different rate.

A further desirable feature of this embodiment resides in the easy replacement of the orifice plates 218. As can be seen in FIG. 15, each of the central studs 220 is provided with a vertical extension 238 which may be gripped by a handling tool (not shown) for removing the orifice plate 218. Should any one of the orifice plates 218 require replacement, it is only necessary to remove the associated fuel element bundle 90 whereupon the orifice plate 218 is exposed for easy replacement.

It should be evident from the foregoing detailed description that the present invention provides orificed fuel assemblies of improved construction which when grouped together form a single nuclear reactor core wherein adjustments of the coolant flow through the various regions thereof may be quickly and easily accomplished. Some adjustments in the coolant flow may be made without disturbing any part of the nuclear reactor core, while others require only the removal of the fuel element bundle in order to gain access to the orifice plate requiring replacement. In either case, however, the adjustments are accomplished with considerable ease and with a minimum of lost operating time.

Although the present invention has been shown in connection with certain specific embodiments, it will be readily apparent to those skilled in the art that various changes in form and arrangement of parts may be made to suit requirements without departing from the spirit and scope of the invention.

I claim as my invention:

1. An orificed fuel assembly for use in a nuclear reactor, comprising in combination: at least one elongated tubular member capable of receiving a fuel element bundle; nozzle means secured at one end of said tubular member and enclosing said one end of said tubular member for introducing a coolant fluid therein; orifice means for controlling the flow of said coolant fluid to said tubular member; and a plurality of tabs projecting axially from the edges at the other end of said tubular member, said tabs inclining outwardly from said assembly and capable of resilient engagement with tabs on adjacent fuel assemblies.

2. A fuel assembly for use in a nuclear reactor, comprising in combination: at least one elongated tubular member being formed from a material having a low neutron absorbing cross section, said tubular member being capable of receiving a fuel element bundle; and nozzle means secured to one end of said tubular member for introducing a coolant fluid therein, said nozzle means being formed from a relatively non-corrosive material; a peripheral wall of said tubular member being held firmly engaged with the outer surface of said nozzle means, said peripheral wall having a plurality of spaced-apart axially extending slits formed therein in the region of overlap with said nozzle means whereby said peripheral wall is expansible to accommodate the difference in thermal expansion between said tubular member and said nozzle means.

3. An orificed fuel assembly for use in a nuclear reactor, comprising in combination: at least one elongated tubular member capable of receiving a fuel element bundle; means secured at one end of and extending longitudinally from said tubular member for enclosing said one end of said tubular member and for directing fluid to said tubular member; said end means having at least one orifice opening through which the fluid enters said end means; and sleeve means operable externally of said fuel assembly and associated with said orifice opening for varying the cross-sectional area thereof to effect a change in the flow of fluid therethrough.

4. An orificed fuel assembly for use in a nuclear reactor, comprising in combination: at least one elongated tubular member capable of receiving a fuel element bundle; nozzle means secured at one end of said tubular member and enclosing said one end of said tubular member and for introducing a coolant fluid therein; said nozzle means having a cylindrical wall with at least one nozzle orifice opening formed therein; and a sleeve engaged with the inner surface of said wall and having at least one orifice opening formed therein which corresponds with said nozzle orifice opening; said sleeve being mounted for rotation about an axis coincident with the central axis of said nozzle means whereby in one extreme position said sleeve permits maximum flow of said coolant fluid through said nozzle orifice opening and said sleeve orifice opening and in a second extreme position said sleeve substantially entirely blocks the flow of said coolant fluid through said nozzle orifice opening.

5. The combination of claim 4 including detent means for said sleeve stationary with respect to said nozzle means with said sleeve orifice opening disposed in a predetermined orientation with respect to said nozzle orifice opening.

6. The combination of claim 5 wherein said detent means comprises serrations formed on one edge of said sleeve; pin means mounted on said nozzle means and engageable in one of said serrations; and spring means urging said sleeve into engagement with said pin means.

7. The combination of claim 4 including means operatively connected with said sleeve for rotating said sleeve with respect to said nozzle means from a point disposed externally of said orificed fuel assembly.

8. An orificed fuel assembly for use in a nuclear reactor, comprising in combination: a plurality of elongated tubular members secured together to form a compartmented can assembly, each of said tubular members being capable of receiving a fuel element bundle; nozzle means secured to the lower end of said can assembly and enclosing the lower ends of said tubular members for introducing a coolant fluid simultaneously into all of said tubular members; said nozzle means having a cylindrical lower wall with at least one nozzle orifice opening formed therein; a transverse orifice plate secured to the lower end of said nozzle means; a cylindrical sleeve engaged with the inner surface of said lower wall and having at least one orifice opening formed therein which corresponds with said nozzle opening; said sleeve being mounted for rotation about an axis coincident with the central axis of said nozzle means whereby in one extreme position said sleeve permits maximum flow of said coolant fluid through said nozzle orifice opening and said sleeve orifice opening and in a second extreme position said sleeve substantially entirely blocks the flow of said coolant fluid through said nozzle orifice opening; detent means maintaining said sleeve stationary with respect to said nozzle means with said sleeve orifice opening disposed in a predetermined orientation with respect to said nozzle orifice opening; a shaft operatively connected with said sleeve for rotating said sleeve with respect to said nozzle means and extending therefrom centrally through said can assembly and disposed externally of said tubular members and terminating at a point disposed externally of said can assembly; and said detent means comprising serrations formed in the upper edge of said sleeve; pin means mounted on said nozzle means and engageable in one of said serrations and spring means interposed between said orifice plate and said shaft thereby urging said sleeve upwardly into engagement with said pin means.

9. An orificed fuel assembly for use in a reactor core having at least one core plate, comprising in combination: a can assembly capable of receiving at least one fuel element bundle; a nozzle secured to the lower end of said can assembly; said nozzle having at least one orifice opening through which fluid enters said nozzle; a sleeve means associated with said orifice opening for varying the cross-sectional area thereof to effect a change in the flow of fluid therethrough; shaft means operatively connected with and for moving said sleeve means from a point disposed externally of said orificed fuel assembly, and spring biased means extending through said nozzle and engaging said core plate with sufficient force to permit the removal of said fuel element bundle from said can assembly in said reactor core.

10. An orificed fuel assembly for use in a nuclear reactor, comprising in combination: a plurality of elongated tubular members secured together to form a compartmented can assembly, each of said tubular members being capable of receiving a fuel element bundle; nozzle means secured at one end of said can assembly and enclosing the adjacent ends of said tubular members for introducing a coolant fluid simultaneously to all of said tubular members; orifice means, one each residing in the lower end of each of said tubular members for controlling the flow of said coolant fluid through said tubular members; and means for detachably securing each of said orifice means to said nozzle means.

11. An orificed fuel assembly for use in a nuclear reactor, comprising in combination: a plurality of elongated tubular members secured together to form a compartmented can assembly, each of said tubular members being capable of receiving a fuel element bundle; nozzle means secured to the lower end of said can assembly and enclosing the lower ends of said tubular members for introducing a coolant fluid simultaneously through all of said tubular members; orifice plates, one each residing within the lower end of each of said tubular members; a supporting member associated with each of said orifice plates and secured to said nozzle means, each of said supporting members having a vertically extending bore; a stud depending from each of said orifice plates through the bore of an associated supporting member; and lock means for detachably securing said studs to said supporting members.

12. The combination of claim 11 wherein said lock means comprises a plurality of resilient fingers formed in the end of said stud, each of said fingers including a shoulder disposed at the lower end thereof which is engaged over the lower edge of said supporting member.

13. The combination of claim 11 wherein each of said orifice plates includes a plurality of upwardly projecting arms capable of supporting a fuel element bundle introduced in the tubular member associated therewith.

14. A fuel assembly for a nuclear reactor comprising a plurality of elongated relatively thin walled tubular members substantially rectangular in section, means for supporting a plurality of elongated fuel elements in separated relation within each of said tubular members, said plurality of tubular members being positioned with adjacent sidewalls engaging one another to form an assembly of generally rectangular cross section and means for securing said tubular members, of said assembly together at least at each adjacent sidewall to increase the stiffness of said assembly, said assembly being formed with one corner of each of said tubular members being located at a substantially common point.

15. The fuel assembly of claim 14 including a nozzle means secured at one end of said assembly and opening into the adjacent ends of said tubular members for introducing a coolant fluid simultaneously to all of said tubular members including orifice means for controlling the flow of said coolant fluid to said tubular members.

16. The fuel assembly of claim 14 including means secured to one end of said assembly and enclosing the corresponding ends of said tubular members for introducing a coolant fluid simultaneously to all of said tubular members.

17. A fuel assembly for a nuclear reactor comprising at least two elongated tubular members substantially square in section, at least two elongated tubular members substantially rectangular in section, means for supporting a plurality of elongated fuel elements in separated relation within each of said tubular members, and means for securing said tubular members together at least at a plurality of spaced points with said fuel assembly being substantially rectangular in section.

18. The combination of claim 17 wherein said square elongated members are located diagonally opposite each other and axially coextensive with one another, and said rectangular elongated members are located diagonally opposite each other and axially coextensive with one another.

19. A fuel assembly for a nuclear reactor comprising a plurality of elongated tubular members substantially rectangular in section, means for supporting a plurality of elongated fuel elements in separated relation within each of said tubular members, and means for securing said tubular members together at least at a plurality of spaced points with said assembly being substantially rectangular in section, and a plurality of tabs projecting axially from the edges of at least two of said tubular members, said taps inclining outwardly from said assembly and capable of resilient engagement with tabs on adjacent fuel assemblies.

20. The combination of claim 13 wherein each of said fuel element bundles includes means for supporting a plurality of elongated fuel elements in separated relation with each of said tubular members; wherein at least two of said tubular members are substantially square in cross section, and at least two others of said tubular members are substantially rectangular in section; and including means for securing said tubular members together at least at a plurality of spaced points with said assembly being substantially rectangular in section and one corner of each of said tubular members being located at a substantially common axis, and a plurality of tabs projecting axially from the edges of at least two of said tubular members, said tabs inclining outwardly in a slight arc from said assembly and capable of resilient engagement with tabs on adjacent fuel assemblies.

References Cited
UNITED STATES PATENTS

| | | | |
|---|---|---|---|
| 2,863,815 | 12/1958 | Moore et al. | 176—77 |
| 2,917,443 | 12/1959 | Grebe | 176—66 |
| 2,926,127 | 2/1960 | McCorkle | 176—63 |
| 2,969,313 | 1/1961 | Grebe | 176—66 |
| 3,060,111 | 10/1962 | Sherman et al. | 176—61 X |
| 3,070,537 | 12/1962 | Treshow | 176—61 X |
| 3,087,882 | 4/1963 | Martin | 176—77 |
| 3,212,990 | 10/1965 | Murtha | 176—78 |
| 3,212,991 | 10/1965 | Brynswold et al. | 176—68 |
| 3,212,983 | 10/1965 | Kornbichler | 176—78 X |
| 3,228,854 | 1/1966 | Bekkering et al. | 176—78 |
| 3,235,463 | 2/1966 | Sankovich | 176—78 X |

BENJAMIN R. PADGETT, *Primary Examiner.*

M. J. SCOLNICK, *Assistant Examiner.*